United States Patent Office 3,503,816

Patented Mar. 31, 1970

3,503,816

CHEMICAL ENGRAVING OF ALUMINUM

Walter G. Zelley, Lower Burrell, Pa., assignor to Aluminum Company of America, Pittsburgh, Pa., a corporation of Pennsylvania No Drawing. Filed Jan. 18, 1967, Ser. No. 610,034

Int. Cl. C23f *1/02;* B41c *1/00*

U.S. Cl. 156—14 4 Claims

ABSTRACT OF THE DISCLOSURE

Aluminum may be chemically engraved by a powderless etching method in which an aluminum plate is etched by a heated aqueous alkaline solution containing lithium hydroxide, another alkali metal hydroxide, and dissolved aluminum. The method is useful for producing photoengraved aluminum printing plates. As an example, in producing such plates the alkaline solution is impinged on a resist coated aluminum surface at a temperature above 150° F., and contains 8 to 60 grams per liter of lithium hydroxide, 10 to 50 grams per liter of sodium hydroxide, and 2 to 8 grams per liter of dissolved aluminum.

This invention relates to the art of chemical engraving. In particular the invention concerns an improved alkaline etching process for chemical engraving of aluminum, such as in the production of a photoengraved aluminum printing plate. As generally used herein the term "aluminum" includes pure aluminum, a commercial grade of aluminum, or an alloy consisting predominantly of aluminum.

In the conventional method of making a photoengraved plate it is customary to apply a light sensitive coating to a clean, flat, or cylindrical plate of an acid soluble metal. After coating, the surface is exposed to light through an image bearing negative so as to form a positive image on the coating. Next the exposed surface is developed, forming an acid-resistant coating in the configuration of the exposed image. This acid-resistant coating is generally further hardened by heating and the resultant thereof is commonly denoted the "resist." the image-bearing surface of the plate is then subjected to an acid etching solution to produce the image in relief. One known method is to etch the image-bearing surface of azinc plate in a powderless etching bath comprising nitric acid, a filming agent, and a water-immiscible organic fluid.

In producing a printing plate by an etching process techniques must be found to reduce "undercutting" or lateral etching; i.e., reduce etching of the relief sidewalls, causing a weakening, distortion or complete loss of the relief image. In the use of the nitric acid etching baths employed for zinc plate, this is accomplished by including insoluble organic agents which produce a removable acid-resistant film on the metal which exerts a controlling effect on the dissolving action of the acid. In conjunction with this controlling effect, which substantially reduces undercutting, the zinc printing plate bearing the final relief pattern is capable of being produced by this etching method in a relatively short period of time. However, aluminum is not etched by nitric acid and therefore cannot be etched by this method.

Since aluminum is a lightweight, dimensionally stable, and relatively inexpensive metal, many proposals have been made for etching or chemically engraving aluminum. But the usual etching processes, when applied to the producing of an aluminum printing plate, do not effectively reduce lateral etching, or require an unduly prolonged etching time, or have no applicability for etching aluminum.

Accordingly, it is an object of this invention to provide a new and improved method of etching aluminum, particularly a method useful in the art of chemical engraving.

It is a further object of the invention to provide a new and improved method for producing a photoengraved aluminum plate, particularly a method in which the plate is etched with an alkaline solution which effectively reduces "undercutting" of the resist, and enables the plate to be produced in a relatively short period of time.

Other objects and advantages of the invention will be apparent to those skilled in the art from the following description of the invention.

Generally, the invention concerns a method of etching an aluminum object having part of its surface masked with a resist coating by repeatedly impinging a hot aqueous alkaline solution containing lithium hydroxide, one or more other alkali metal hydroxides, and dissolved aluminum onto the surface of the aluminum object so as to contact both the masked and unmasked portions thereof. In the preferred method of practicing the invention, the etching solution is maintained at a temperature of at least 150° F. and consists of 8 to 60 grams per liter of lithium hydroxide, 10 to 50 grams per liter of some other alkali metal hydroxide, preferably sodium hydroxide, in water, and dissolved aluminum in an amount at least equivalent to two grams per liter.

Although the invention is applicable, generally, for the production for etched aluminum products, it will be particularly described in conjunction with the production of aluminum photoengraved printing plates suitable for alkaline etching. It is understood, that any commonly known method of preparation resulting in an object of aluminum having a surface portion thereof masked with an alkaline resist coating may be employed.

Conveniently, the aluminum plate is prepared for a resist coating by providing the aluminum surface with a thin chromate conversion coating such as that described in U.S. Patents Nos. 2,796,370 and 2,796,371. This coating serves to bind the subsequently applied resist to the surface of the aluminum object. In preparing photoengraving plates, a photosensitive resist is applied to the plate. Any photosensitive resist capable of withstanding a hot alkaline solution may be employed, such as Eastman Kodak Company's KMER Resist. The resist can be applied by whirling, spraying, flow coating, or by any other suitable method. Then the plate is air dryed and oven cured. Next the resist coated plate is exposed through a negative, and developed, permitting the removal of the areas which have not been hardened by the light. Where it is desirable to do so, a short time caustic etch may then be employed to clean the areas of the surface not protected by the developed resist. The plate having the KMER resist coating in the image area is thus made ready for the etching process.

Alternatively, a plate may be prepared with a metallic coating such as electrodeposited copper or nickel as the resist. In this case, the metallic coating is electroplated onto the entire surface of the aluminum plate and a conventional resist for acid etching is applied. After exposure and development in the usual way, the metallic coating is dissolved from the nonimage areas with nitric acid. The plate is then ready for the alkaline etching process with, in this case, the electrodeposited metallic coating serving as the image protecting resist.

Before subjecting the prepared aluminum plate to the etching process it is desirable to produce a condition of dissolved aluminum in the etching solution at the time of preparation of the solution. While this may be accomplished in various ways, one preferred method of producing the condition is to dissolve aluminum, such as scrap aluminum, in an amount equivalent to at least 2 grams per liter, but not more than 8 grams per liter, in aqueous lithium hydroxide, and thereafter adding the additional alkali metal hydroxide. With the particular etching solution of the invention, this condition is produced in a relatively short period of time and does not require continued regulation of any of the etching solution's constituents. After about 8 grams per liter of aluminum is dissolved, an additional amount of sodium hydroxide should be added to maintain the activity of the solution.

This condition of dissolved aluminum in the etching solution can also be accomplished by adding an amount of sodium aluminate equivalent to the addition of at least 2 grams per liter of aluminum. However, this method of producing the dissolved aluminum condition may require addition of a greater amount of the other constituents of the etching bath in order to maintain the desired activity of the etching solution.

The etching solution thus prepared is maintained at a temperature of at least 150° F. and is repeatedly impinged upon the surface of the prepared aluminum plate so as to contact both the masked and unmasked portions thereof. The etching of the aluminum object proceeds in depth, while the dissolving action laterally, that is in a direction which tends to dissolve away the metal in relief or to undercut the resist, is substantially reduced, an a high "etch factor" is obtained. The term "etch factor" is defined as the ratio of the depth of the etch adjacent to a line of resist to one-half of the loss in width of metal at the top of the surface of the relief beneath the line of resist.

It appears that during this etching of the plate some film forming reaction takes place on the unmasked portion thereof, one that favors penetration to the aluminum at the point of direct impingement of the solution but hinders lateral etching. Analysis reveals that some type of lithium-aluminum compound forms as a film on the surface of the aluminum object. This film is penetrated by the etching solution at the point of direct impingement, but as etching proceeds the film apparently tends to protect the sidewalls of the relief image, thereby effectively minimizing undercutting of the resist. The etching solution repeatedly impinging upon the plate produces etching in increasing depth.

The etching solution may be repeatedly impinged upon the plate or other object to be etched by any of the methods known in the art such as air atomization, wherein the etching solution is repeatedly impinged upon the object to be etched through an atomizing nozzle. Another commonly employed method is the splash method, wherein a series of paddles beat the surface of the bath and this causes the etching solution to be repeatedly impinged upon the object to be etched as it is held above the bath in a position to receive the splash. The alkaline solution after being impinged against the object to be etched drops back into the bath or against the paddles thereby enabling the repeated impingement to proceed. Following are illustrative examples.

EXAMPLE 1

A 12" x 12" x 0.025" plate cut from a sheet of 1100 grade aluminum was cleaned and coated with a thin chromate conversion coating, and a photosensitive KMER resist coating was applied and cured. The resist coated plate was then exposed through a negative and developed to remove the areas which had not been hardened by the light. The plate was mounted in a paddle type splash etcher above the prepared etching bath. The etching solution was prepared by dissolving scrap aluminum in aqueous lithium hydroxide and thereafter adding sodium hydroxide, according to the formulation:

37 grams per liter by weight lithium hydroxide (obtained by adding 65 grams per liter of $LiOH \cdot H_2O$)
2 grams per liter by weight dissolved aluminum
20 grams per liter by weight sodium hydroxide The solution was heated to a temperature of 165° F. and repeatedly impinged upon the plate until the desired etching depth was obtained. The plate in this example was etched to a depth of 10 mils in 15 minutes and exhibited an etch factor of 20:1.

EXAMPLE 2

For etching a plate similar to that of Example 1, an etching solution was prepared according to the formulation:

25 grams per liter by weight of lithium hydroxide (obtained by adding 45 grams per liter of $LiOH \cdot H_2O$).
2 grams per liter by weight of dissolved aluminum
15 grams per liter by weight of sodium hydroxide The solution was heated to a temperature of 165° F. and repeatedly impinged upon the plate until the desired etching depth was obtained. The plate in this example was etched to a depth of 11.5 mils in 20 minutes and exhibited an etch factor of 20:1.

The etched aluminum plate finally produced may optionally be further treated for the purpose of increasing its wear resistance.

For example, a suitable wear resistance may be obtained either by anodizing the etched aluminum plate by known anodizing techniques or by chromium plating the etched aluminum plate, or by any other method known in the art to increase the wear resistance of the finally etched aluminum plate.

What is claimed is:

1. A method of etching an object of aluminum to make a printing plate having a surface portion thereof masked with a resist coating and unmasked portions which comprises:

repeatedly impinging upon the surface of the object so as to contact both the surface portion thereof masked with a resist coating and the unmasked portions thereof, a solution maintained at a temperature of at least 150° F. and consisting essentially of
- 8 to 60 grams per liter of lithium hydroxide,
- 10 to 50 grams per liter of at least one additional compound selected from the group consisting of alkali metal hydroxides other than lithium hydroxide,
- dissolved aluminum in an amount at least equivalent to two grams per liter, and
- water.

2. A method of etching an object of aluminum according to claim 1 wherein said solution contains 10 to 50 grams per liter of sodium hydroxide as the additional alkali metal hydroxide.

3. A method of etching an object of aluminum according to claim 2 wherein said dissolved aluminum content is provided by dissolving aluminum in an aqueous solution of lithium hydroxide and thereafter adding sodium hydroxide to the solution prior to its use.

4. A method of making an aluminum printing plate which comprises:

repeatedly impinging a solution upon both masked and unmasked portions of an aluminum plate having on the masked portions a plural resist coating consisting essentially of a chromate conversion coating covered by a photoresist, said solution being maintained at a temperature of at least 150° F. and consisting essentially of 8 to 60 grams per liter of lithium hydroxide, 10 to 50 grams per liter of at least one additional compound selected from the group consisting of alkali metal hydroxides other than lithium hydroxide, dissolved aluminum in an amount at least equivalent to two grams per liter, and water.

References Cited

UNITED STATES PATENTS

| | | | |
|---|---|---|---|
| 2,472,304 | 6/1949 | Mason | 156—22 |
| 2,506,164 | 5/1950 | Morse | 156—22 X |

JACOB H. STEINBERG, Primary Examiner

U.S. Cl. X.R.

156—22; 252—79.5